United States Patent [19]

Lehr

[11] Patent Number: 4,863,635

[45] Date of Patent: Sep. 5, 1989

[54] METHOD OF TREATING THE SURFACE OF POLYMERS WITH A CUPROUS COMPOUND TO FORM A COPPER SULFIDE COMPOSITE STRUCTURE

[75] Inventor: Marvin H. Lehr, Akron, Ohio

[73] Assignee: The B. F. Goodrich Company, Akron, Ohio

[21] Appl. No.: 190,559

[22] Filed: May 5, 1988

[51] Int. Cl.$^4$ .............................................. H01B 1/06
[52] U.S. Cl. ................................... 252/518; 525/354; 525/371; 252/500; 523/137; 524/420
[58] Field of Search ....................... 252/500, 512, 518; 525/370, 371, 343, 354; 523/137; 524/401, 420; 427/443.1

[56] References Cited

U.S. PATENT DOCUMENTS

| | | |
|---|---|---|
| 3,682,786 | 8/1972 | Brown et al. |
| 4,556,508 | 12/1985 | Tomibe et al. ................ 252/518 |
| 4,604,427 | 8/1986 | Roberts et al. |
| 4,670,189 | 6/1987 | Tomibe et al. ................ 252/518 |

Primary Examiner—Josephine Barr
Attorney, Agent, or Firm—James R. Lindsay; Nestor W. Shust

[57] ABSTRACT

A method for making a conductive polymer for static charge dissipation, electromagnetic induction shielding, electroplating, or making a semiconductor comprises uniformly mixing into any number of polymer or polymer blends which are in a molten or semimolten state about 1 to about 30% by weight of sulfur to form a polymer/sulfur blend. Once the polymer/sulfur blend is solidified, by cooling, it is exposed to an aqueous cuprous ion solution whereby the cuprous ions react with the sulfur in the polymer/sulfur blend to form copper sulfide dendrites within the polymer. The aqueous cuprous ion solution may also contain elemental sulfur to aid in the formation of the copper sulfide. Additionally, the aqueous cuprous ion solution may also contain an effective amount of dilute hydrochloric acid or dilute ammonium hydroxide to aid in the facilitation of complexation. The conductive polymers of the present invention have a resistivity of less than about 10,000 ohms/sq. and preferably less than about 400 ohms/sq.

13 Claims, 8 Drawing Sheets

Conductive CPVC

Conductive CPVC Cu map

EFFECT OF DRYING ON SURFACE RESISTANCE OF POLYMERIC PLASTICIZER/PVC/$Cu_2S$ COMPOSITE 0.5mm SHEET

METHOD OF TREATING THE SURFACE OF POLYMERS WITH A CUPROUS COMPOUND TO FORM A COPPER SULFIDE COMPOSITE STRUCTURE

BACKGROUND OF THE INVENTION

1. Field of the Invention

The present invention concerns treating the surface of various polymers such that they are useful for static charge dissipation, electromagnetic induction shielding, or electroplating, and the like. Typically, these methods of treatment include depositing copper sulfide on the surface of the polymer so that the surface of the polymer becomes conductive. In particular, the present invention is a novel method for treating the surface layer of the polymers with cuprous ion to produce therein a copper sulfide composite so that the surface will be conductive. Additionally, the present invention relates to a composite material comprising a polymer whose surface has been treated so that dendritic crystals of copper sulfide are integrally incorporated within the polymer.

2. Prior Art

Different methods of applying copper sulfide to the surface of various polymers are known in the prior art. These prior art processes include many steps to incorporate the copper sulfide into the polymer surface. The prior art patents generally treat the polymer chemically in order to form copper sulfide. The chemical treatment can consist of swelling the polymer, blending within the voids of the polymer elemental sulfur, reversing the swelling such that the polymer shrinks to approximately its original dimensions, and reacting the polymer/sulfur blend with a copper compound to form a copper sulfide layer on the polymer. The following U.S. patents are exemplary of such prior art processes.

U.S. Pat. No. 3,682,786 to Brown et al. discloses plastic substrates, such as polypropylene or ABS, for example, which are treated with a solution or dispersion of sulfur in a suitable swelling solvent, such as trichloroethylene; contacted with an aqueous solution of a cuprous salt, such as cuprous chloride; and electroplated to form a coating of the desired metal. During the treatment of the plastic substrate with the sulfur-containing solvent solution, the surface of the plastic substrate swells and the sulfur-containing solvent solution is carried into the surface. Sulfur is trapped in the surfaces of the plastic substrate once the plastic substrate shrinks when removed from the chlorinated solvent (trichloroethylene).

U.S. Pat. No. 4,604,427 to Roberts et al. discloses a chemical method of forming an electrically-conductive polymer blend which comprises impregnating a nonporous, swellable or soluble host polymer with one or more cyclic compounds consisting of pyrrole aniline and substituted analogs thereof, and at least one chemical oxidant selected from the group consisting of trivalent and tetravalent compounds, such as copper, silver, cerium, molybdenum, chromium and tungsten, said oxidant being dissolved in a solvent capable of swelling or solubilizing said host polymer.

The prior art processes incorporate many steps, produce only limited results, and are expensive by comparison with the present invention.

Due to the limitations on the prior art processes and the products produced, there is a need for an inexpensive process to treat polymer surfaces. Additionally, there is a need to treat the entire thickness of a polymer film, for example, such that the polymer may be more useful than merely for electroplating. For example, the treated polymers could be useful as semiconductors which would require a current to be transmitted through a film of the treated polymer. Prior art processes, which are only treated on their surfaces, cannot be employed in such applications.

Lastly, the use of organic solvents to swell the polymer is not desirable due to health and safety reasons, and because the polymer must be carefully dried to remove residual solvent. The removal of solvent would be especially important if the surface were to be electroplated.

It is a chief aim of the present invention to develop a simpler method to make polymers conductive. It is also an aspect of the present invention to form a treated polymer different from prior art polymers in that it is capable of being conductive throughout its entire thickness.

It is also a feature of the present invention to make a polymer conductive without using organic swelling agents and thus avoid health and safety considerations of the prior art.

SUMMARY OF THE INVENTION

The process of the present invention is simpler than the techniques described in the prior art in that swelling agents and chemical modifications of the polymers are unnecessary. The first step in manufacturing a polymer such that it is conductive is to treat the polymer in the melt state with the simple addition of elemental sulfur in concentrations ranging from 1 to 30 weight percent. While higher concentrations of sulfur could be used for making the mixture conductive (after treatment with cuprous ions), this is usually undesirable because dissolution of the polymer with elemental sulfur lessens the mechanical properties of the polymer.

The polymer/sulfur blend with 1 to 30 weight percent of sulfur is then reacted with a source of cuprous ions (Cu+) generally in the presence of metallic copper. The sulfur reacts with the cuprous ions to form copper sulfide. The resistivity of the conductive polymer copper sulfide composition of the present invention is generally below about 10,000 ohms/sq., and preferably below about 400 ohms/sq.

In the broadest sense, the present invention relates to a method of forming a conductive polymer by mixing into a polymer in a molten or semi-molten state, an effective amount of sulfur (ranging from about 1 to about 30% by weight of a polymer/sulfur blend), and exposing said polymer/sulfur composition to an aqueous cuprous ion solution at from about 0° C. to about 100° C. for a sufficient time to cause the cuprous ions to react with the sulfur to form copper sulfide. If a lower temperature is employed, the polymer should contain a sufficient amount of plasticizer to make the polymer more flexible and thus more receptive to copper sulfide formation within the polymer. Likewise, if a higher temperature is employed, the polymer may be more rigid (containing less plasticizer). Any typical plasticizer is acceptable, such as dioctyl phthalate. The preferred temperature range is from 40° C. to 80° C.

If the temperature is below 0° C., the aqueous cuprous ion solution is near freezing and reaction of cuprous ion with sulfur is slow. If the temperature is more than about 100° C., the aqueous cuprous ion solution is near the boiling point. Accordingly, operating below 0° C. or above 100° C. is not practical.

The broadest scope of the present invention also includes a conductive product comprising a polymer/sulfur blend, which contains 2.5–20 weight percent sulfur based on the polymer+sulfur weight, and an amount of added copper ranging from 0.5–50 weight percent, depending on the weight percent of added sulfur, but less than the amount required to form the stoichimetric composition of cuprous sulfide, $Cu_2S$. The cuprous sulfide that is produced according to the present invention is in the form of dendrites.

The broadest scope of the present invention also includes a conductive polymer comprising polymer and dendritic copper sulfide in a sufficient amount so as to be useful to dissipate a static charge, serve as electromagnetic induction shielding, or capable of being electroplated.

BRIEF DESCRIPTION OF THE DRAWINGS

Other aims and advantages of the invention will become apparent upon reading the following detailed description and upon reference to the drawings, in which.

DESCRIPTION OF THE PREFERRED EMBODIMENTS

Figure 1:
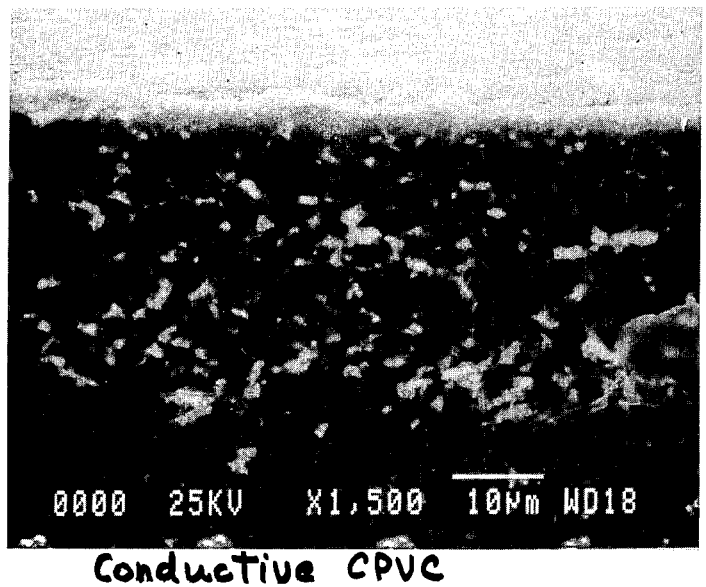
FIG. 1 is a photomicrograph of a cross-section of a sheet of CPVC and copper sulfide clearly indicating the dendritic form of the copper sulfide in the polymer according to the present invention.

Many metals, such as silver, copper and nickel, exist in nature as sulfides. The metal sulfides, as a group, are known to exhibit metallic lustre and electric conductivity. Compared to metals, such as copper and silver, the copper sulfides possess conductivities of at least two or more orders of magnitude less. To make a conductive polymer, metal sulfide in powdered form, for example, could be milled into the desired polymer. However, too much metal would be needed to make the polymer conductive.

To further understand the chemical reactions taking place, the following reaction is needed:

$$4\,Cu^{++} + S \rightarrow Cu_2S + 2\,Cu^{++}$$

The cuprous ion is oxidized in the above reaction while sulfur is reduced to create copper sulfide. The cupric ion ($Cu^{++}$) concentration will continue to increase as more and more compound containing sulfur is treated. There is, however, a way to prevent the cupric ion build-up, and that is to add metallic copper, as a powder, turnings, or some other form having a large surface area, to take advantage of the known reaction:

$$Cu^{++} + Cu \rightarrow 2\,Cu^+$$

The cupric ions react with the elemental copper to form cuprous ions. Thus, in the presence of metallic copper, the overall reaction of the above two equations becomes:

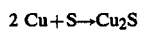

$$2\,Cu + S \rightarrow Cu_2S$$

The purpose of the cuprous ion ($Cu^+$) is simply, therefore, to catalyze the reaction because, unlike the metallic copper ions, the cuprous ions are mobile and can readily react with the sulfur ions. The cuprous concentration is never high because the equilibrium ratio between cupric ions and cuprous ions is about $1 \times 10^6$.

Any source of cuprous ions, such as cuprous chloride (CuCl), cuprous oxide ($Cu_2O$) or other cuprous salts will suffice provided that the source of cuprous ions can be dissolved in an aqueous medium. Since dissolution of the cuprous salt is facilitated by complexation, dilute hydrochloric acid (to form the chloride complex) or dilute ammonium hydroxide (to form the ammonium complex), or the like, is recommended.

There are any number of procedures which can produce cuprous ions from many different cuprous compounds. An aqueous cuprous solution would be colorless. An aqueous cupric solution would be dark blue-green in color. Accordingly, a solution which is either colorless or light green in color contains a significant amount of cuprous ions. The following procedures demonstrate the different methods of producing a cuprous ion solution.

PROCEDURE 1

Concentrated hydrochloric acid (HCl) and distilled water were blended together in which 18 ml. of HCl was diluted with distilled water to one liter to produce a 0.2 N solution. The one liter HCl solution was mixed at room temperature with 10 grams of cuprous chloride (CuCl) to give a partially dissolved CuCl slurry. The mother liquor was light green in color. The reaction was conducted without stirring at 25° C.

PROCEDURE 2

A 0.5 N HCl solution was prepared and heated to 80° C. Enough cuprous chloride was added to produce a slurry. The slurry was allowed to settle and the mother liquor decanted. The mother liquor was light green in color as in the first procedure, and was stirred with a magnetic stirrer at 40 to 50° C. during reaction. Further variations of this method include running the reaction at different temperatures.

PROCEDURE 3

An aqueous solution of cuprous ions was prepared by slurrying 24 grams of cuprous chloride in a 1 N HCl solution at 60° C. The mixture was decanted and the colorless mother liquor was used for reaction at 60° C. with stirring.

PROCEDURE 4

A fourth procedure is to slurry 24 grams of cuprous chloride in a 1 N solution of HCl at 60° C. and add thereto 7.6 grams of copper powder. The mother liquor was colorless but not decanted from the solids.

PROCEDURE 5

A fifth procedure is to dissolve 149 grams of potassium chloride in one liter of water and blend therewith 24 grams of cuprous chloride and 7.6 grams of copper powder at a temperature of 60° C. The resultant mother liquor was colorless.

PROCEDURE 6

A sixth procedure is to dissolve 0.6 grams of cuprous oxide ($Cu_2O$) in a 1 N HCl solution at 60° C. To the resultant solution was added 7.0 grams of copper powder to create a slurry. The resultant color of the mother liquor was colorless.

PROCEDURE 7

A seventh procedure calls for concentrating 4 grams per liter of cuprous chloride with 5 grams per liter of metallic copper in a 0.38 N HCl solution. The copper metal employed was a mesh and was left standing in the solution. At 68° C. all the copper chloride dissolved. The liquid was colorless and generally remained so during most of the resultant reactions set forth in the following Examples. On cooling, white cuprous chloride precipitated from the solution leaving a dark blue-green mother liquor (cupric ions from air oxidation). Later, the slurry was demonstrated to be active by reheating and dissolving the white copper chloride particles into solution. Even though the mother liquor was blue-green at this point, the solution was still active in forming copper sulfide.

The above procedures for producing cuprous ions in an aqueous solution were employed in the following Examples to demonstrate that a conductive copper sulfide ($Cu_2S$) can be formed on a polymer/sulfur blend. Although some polymers perform better than other polymers when tested with the present invention, there was no polymer tested that did not work. The broad range of polymers tested were: chlorinated polyvinyl chloride, polyvinyl chloride Kraton (hydrogenated-styrene-butadienestyrene block copolymer), chlorinated polyethylene, ethylene-propylene copolymer, propylene, polyurethane, and polyepichlorohydrin.

The measurement of surface conductivity in the following examples is expressed in terms of surface resistivity, the inverse of conductivity, and is measured by using two electrodes (1 $cm^2$, each) at 1 cm apart. Since resistivity is usually in units ohm-cm, to convert the surface measurement to these units, the thickness of the conductive surface must be known. Since this is not always possible, the surface resistivity is expressed in units of ohm/sq. ($\Omega\Box$), thus resistivity ($\rho$) is $\rho = \Omega\Box \times T$ where T is the thickness of the conductive layer.

The following examples demonstrate the invention, i.e., making a polymer conductive by forming copper sulfide thereon.

EXAMPLE 1

A polymer/sulfur composition was made by blending the following ingredients on a mill at 190° C., as is typical.

| Ingredients | Wt./Parts |
| --- | --- |
| Chlorinated polyvinyl chloride (CPVC) | 70 |
| Sulfur (S) | 30 |
| Barium carbonate ($BaCO_3$) (stabilizer) | 5 based upon 100 weight parts of CPVC/S blend |
| Polyethylene lubricant | 0.5 based upon 100 weight parts of CPVC/S blend |

A first opaque film 0.3 mm thick was pressed between high gloss chromed sheets at 155° C. A piece of the film was treated with cuprous ions according to Procedure 1 set forth previously for making a cuprous ion solution. The film became black immediately (indicating the formation of copper sulfide) and was reacted for 15 minutes. After drying the sample, the surface resistivity was measured and determined to be 400 ohms/sq. The untreated film gave a resistivity of greater than $10^7$ ohms/sq. Accordingly, the polymer surface was made conductive. A scanning electron photomicrograph showed that the polymer had a copper sulfide composite layer which varied from 5 to 25 microns in thickness.

A second film of the above composition was similarly pressed between Mylar ® sheets at 165° C. After 15 minutes reaction according to Procedure 2 for forming a cuprous ion solution, the surface resistivity was measured at between 60 and 100 ohms/sq depending upon where the measurement took place on the treated polymer film.

EXAMPLE 2

A polymer/sulfur blend was made by compounding the following ingredients on a mill at 190° C.

| Ingredients | Wt./Parts |
| --- | --- |
| CPVC | 80 |
| Sulfur | 20 |
| Titanium Dioxide (pigment) | 5 based upon 100 parts of the polymer sulfur blend |
| Barium carbonate (stabilizer) | 5 based upon 100 parts of the |

| Ingredients | Wt./Parts |
|---|---|
| | polymer sulfur blend |
| Polyethylene | 2 based upon |
| (lubricant) | 100 parts of the polymer sulfur blend |
| KM330 (acrylic impact modifier) | 12 based upon 100 parts of the polymer sulfur blend |
| Kraton G-1652 | 4 based upon 100 parts of the polymer sulfur blend |

KM330 is methylmethacrylate grafted onto an acrylic rubber. Kraton G-1652 is a hydrogenated styrene/-butadiene/styrene block copolymer. Kraton G-1642 is employed as a processing aid and impact modifier. An injection molded bar was formed at 210° C. having the dimensions of 3×12×125 mm. The bar was treated according to Procedure 2 for forming a cuprous ion solution. The treatment lasted 15 minutes and the surface resistivity was determined to be 450 ohms/sq.

A film of the above composition was also made and was pressed between aluminum foil at 165° C. and reacted according to Procedure 2 for forming cuprous ions in solution for 15 minutes. The reaction was slow. Surface resistivity was about 2,000 ohms/sq which further indicated the slow reaction. The surface resistivity of an untreated film was greater than $10^7$ ohm/sq. The exact surface resistivity of the untreated film could not be determined because the testing equipment was incapable of measuring any higher.

EXAMPLE 3

The importance of sulfur concentration in CPVC in developing a conductive composite is illustrated by the following compositions. These compositions vary the amount of sulfur in the CPVC/S blends.

| | Compositions | | | | |
|---|---|---|---|---|---|
| Ingredient | 1 Wt. Pts | 2 Wt. Pts. | 3 Wt. Pts. | 4 Wt. Pts. | 5 Wt. Pts. |
| CPVC | 80 | 80 | 84 | 84 | 84 |
| Sulfur | 20 | 20 | 16 | 16 | 16 |
| | wt. pts. per 100 pts. of CPVC/sulfur blend | | | | |
| KM330 (acrylic impact modifier) | 12 | 16 | 16 | 16 | 16 |
| Polyethylene | 2 | 2 | 2 | 2 | 2 |
| Barium carbonate | 5 | 5 | 5 | 5 | 5 |
| Titanium dioxide | 5 | 5 | 5 | 5 | 5 |
| Ferro 1840 (Ba-Cd stabilizer) | — | — | — | 2 | — |
| Kraton G-1652 | 4 | 4 | 4 | 4 | — |

After powder blending the above ingredients for each composition and heating them in an air oven at 150° C. for 10 minutes to melt and absorb the sulfur, the compositions were milled at 190° C. for 1 minute. Films of about 0.15 mm in thickness were pressed between Mylar ® sheets at 200° C. and reacted with the cuprous ions according to Procedure 2 for 15 minutes as previously mentioned. The copper weight increase and the surface resistivity of each composition were determined as follows:

| | Composition | | | | |
|---|---|---|---|---|---|
| | 1 | 2 | 3 | 4 | 5 |
| Copper gain (wt. %) | 2.3 | 1.8 | 1.1 | 0.9 | 0.15 |
| Resistivity in ohm/sq. | 2,000–7,500 | $1.5-5 \times 10^5$ | $\leq 1.5 \times 10^6$ | $\leq 1 \times 10^6$ | $\leq 2 \times 10^6$ |

From the above data, it appears that a CPVC/sulfur blend must be employed in which the amount of sulfur is at least above 16 wt. blend parts (an preferably about or above 20 wt parts) in order to develop a meaningful conductivity in the polymer blends.

EXAMPLE 4

This example demonstrates the effect of an increase in conductivity if the polymer is dried and stored at room temperature rather than immediately tested. Additionally, an ABS impact modifier (Blendex) was compared with an acrylic impact modifier (KM330). A polymer/sulfur blend was prepared employing the following ingredients:

| | Amounts - Wt. Pts. | | | |
|---|---|---|---|---|
| Ingredients | 1 | 2 | 3 | 4 |
| CPVC | 80 | 80 | 80 | 80 |
| Sulfur | 20 | 20 | 20 | 20 |
| | wt pts per 100 pts of CPVC/S blend | | | |
| KM330 | 12 | | | |
| Blendex 310 | | 12 | 16 | 16 |
| Polyethylene | 2 | 2 | 2 | 2 |
| Barium carbonate | 5 | 5 | 5 | 5 |
| Titanium dioxide | 5 | 5 | 5 | 5 |
| Ferro 1840 | — | — | — | 2 |
| Kraton G-1652 | 4 | 4 | 4 | 4 |

These films were formed by compounding on a mill. Films of about 0.55 mm. in thickness were formed and pressed at 170° C. between Mylar ® sheets. The film was reacted in a cuprous ion solution prepared by Procedure 4 for 15 minutes. It was discovered that air-dried samples, which were dried further overnight at 50° C., or at room temperature for several days, showed an order of a magnitude increase in conductivity. The results are set forth below:

| | Compositions | | | |
|---|---|---|---|---|
| | 1 | 2 | 3 | 4 |
| Copper gain (wt. %) | 7.4 | 4.4 | 4.0 | 7.7 |
| Resistivity (ohms/sq.) air dried | 290–300 | 90–110 | 300 | 200–250 |
| Resistivity (ohms/sq.) dried at 50° C. for 16 hrs. | 30–50 | 18–20 | 30–50 | 30–50 |

It was discovered that both temperature of molding and the pressure applied effect the resistivity and the percent weight copper gain. Set forth below is Composition 1 of Example 4 in which the cuprous ions were reacted with the polymer/sulfur blend for 16 minutes according to Procedure 4. From the results it appears that a molding temperature of about 210° C. does not lead to much formation of copper sulfide in later treatment. It is believed that at such a temperature the distribution of the sulfur in the blend may not be favorable enough so as to be readily available for reaction with Cu+ after the sample has cooled.

| | Run | | | |
|---|---|---|---|---|
| | A | B | C | D |
| Temperature (°C.) | 170 | 170 | 210 | 210 |
| Pressure (tons) | 10 | 30 | 10 | 30 |
| Film weight (in grams) | 1.64 | 1.39 | 1.91 | 1.92 |
| Copper gain (in grams) | 1.64 | 1.39 | 1.91 | 1.92 |
| Copper gain (wt. %) | 3.9 | 3.3 | 0.3 | 0.23 |
| Conductivity (ohms/sq.) dried 16 hrs. 50° C. | 60 | 160–180 | >$10^7$ | >$10^7$ |

Composition 1 of Example 4 (which had a 7.4 wt. % copper gain) is shown in FIG. 1. Illustrated is a scanning electron photomicrograph of a cross section perpendicular to the surface of the film, part of which is seen at the top as a white continuous phase representing the conductive surface. The copper sulfide is illustrated as white domains dispersed in the polymeric matrix which is illustrated in the photomicrograph as the dark region. It is evident that a fibrous or dendritic structure of the copper sulfide exists in the surface layer, in which many contact points of the dendritic structure overlap and contact other dendritic structures. Such a network probably accounts for the conductive nature of the composition.

Figure 2:
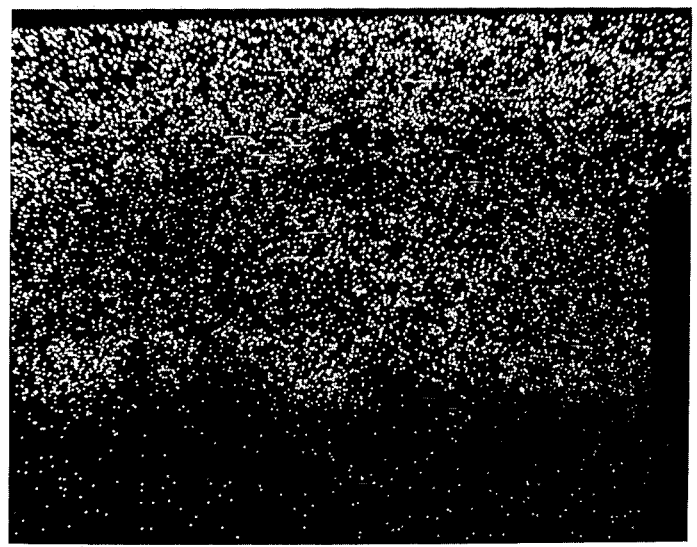
FIG. 2 is a photomicrograph of a cross-section of the polymer/copper sulfide blend illustrated in FIG. 1, illustrating an X-ray dispersive map of the copper ions within the polymer.

FIG. 2 is a photomicrograph of an X-ray dispersive map of the copper ions of the cross section illustrated in FIG. 1. The heavy concentration of white dots are the copper ions, found both on the surface and below the surface to a depth of approximately 33 microns the conductive layer which represents the reaction front highlighted by the demarcation between the concentrated dots and the sparsely dotted region. The sparsely dotted region constitutes background scattering and is typical whenever any element is probed by the scanning electron photomicrograph.

EXAMPLE 5

The following example demonstrates the effect sulfur concentration has in the formation of copper sulfide and the corresponding surface resistivity. The following ingredients were milled together in the following compositions:

| | Composition - Wt./Pts. | | |
|---|---|---|---|
| Ingredients | 1 | 2 | 3 |
| PVC | 80 | 90 | 95 |
| Sulfur | 20 | 10 | 5 |
| | per 100 parts of PVC/Sulfur Blend) | | |
| Ferro 1840 (Stabilizer) | 1.6 | 1.6 | 1.6 |
| Calcium Carbonate | 40 | 40 | 40 |
| Polyethylene | 2 | 2 | 2 |
| Dioctyl Phthlate (plasticizer) (wt. parts per 100 parts of PVC/Sulfur Blend) | 53 | 53 | 53 |

Both films having a thickness of 0.15 mm. and sheets having a thickness of 1.7 mm. were prepared at 170° C. as the molding temperature. The films and sheets were reacted with the cuprous ions of Procedure 4 at 55° C. for 15 minutes.

The results of the percentage weight gain of copper and the resistivity are set forth in the following table:

| | Films | | |
|---|---|---|---|
| | 1 | 2 | 3 |
| Copper weight gain | 8.3 | 6.2 | 4.0 |
| Resistivity in ohms/sq. | 60–80 | 300 | 4,000–5,000 |
| | Sheets | | |
| | 1 | 2 | 3 |
| Copper weight gain | 1.9 | 0.88 | 0.54 |
| Resistivity in ohms/sq. | 70–100 | 800–1,000 | 75,000–100,000 |

Since plasticized PVC has a surface resistivity in ohms/sq. of greater than $10^7$, it is evident that even a small amount of sulfur, such as that used in Composition 3, is useful in forming sufficient amounts of copper sulfide that a reduced surface resistivity is readily evident, at least with respect to this films.

EXAMPLE 6

This example demonstrates aging of a sample at room temperature causes the surface resistivity to decrease.

Figure 3:
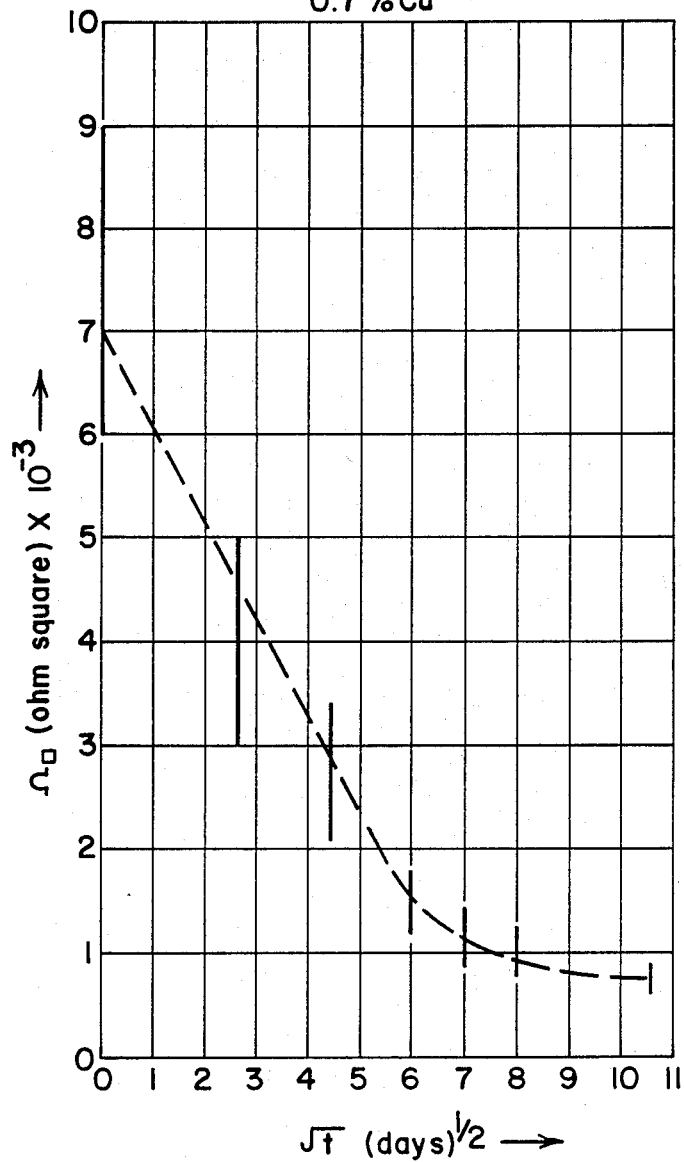
FIG. 3 is a graph of surface resistivity in ohms/sq. vs. the square root of time in days of a plasticized polymeric PVC copper sulfide composite illustrating the change in surface resistance with aging.

A PVC containing a polymeric plasticizer was employed for this experiment. The plasticizer was a glutarate polyester from C. P. Hall Corp. having a average molecular weight of 5,000. The vinyl chloride monomer was polymerized in the presence of the plasticizer. The PVC had 41.5% by weight plasticizer. The plasticized PVC was a white powder and free-flowing. A composition of 10% sulfur was milled in at 140° C. A sheet of 76 mm×76 mm was pressed at 170° C. between Mylar ® sheets. The sheet had a thickness of 1.7 mm. and was reacted with a cuprous ion solution according to preparation 4 at 50° C. for 15 minutes. The results are shown in FIG. 3 and indicate that the decrease in resistivity is initially linear with the square root of time, and then levels off at about 750 ohms/sq.

EXAMPLE 7

Figure 4:
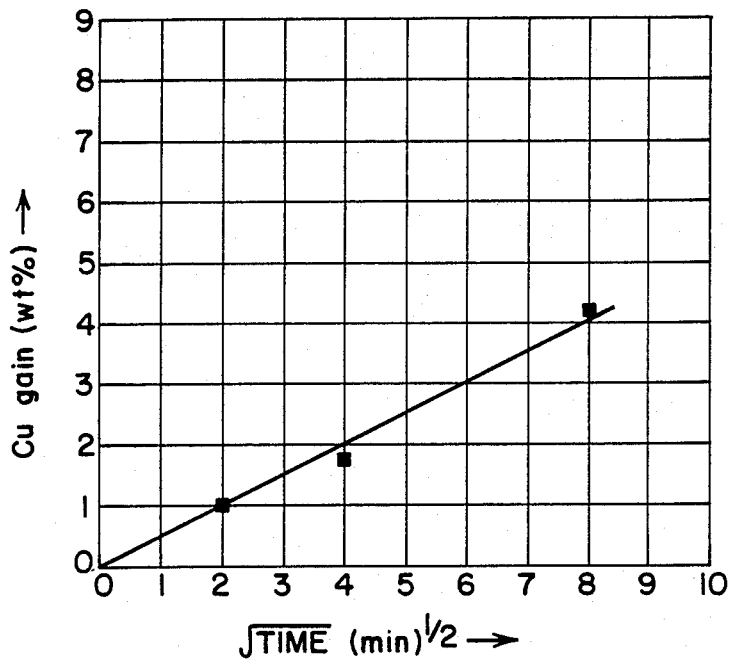
FIG. 4 is a graph of the copper gain in weight percent vs. the square root of time of a plasticized PVC/copper sulfide blend.
Figure 5:
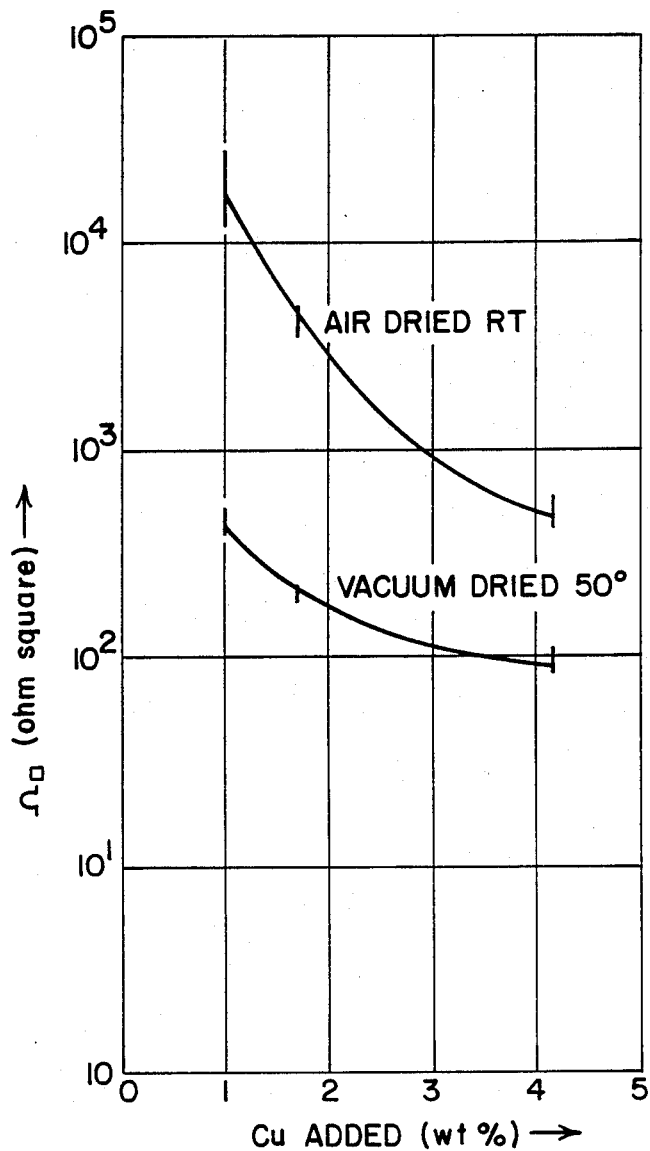
FIG. 5 is a graph of surface resistivity vs. copper gain in weight percent demonstrating the effect of both vacuum drying and air drying on a plasticized PVC copper sulfide composite.

Another polymeric plasticized PVC composition was prepared according to Example 6. It contained 34 wt. % plasticizer consisting of adipic acid and propylene glycol. A polymer/sulfur blend was made with 90 weight parts of plasticized PVC and 10 weight parts of sulfur. The polymer/sulfur blend was milled at 170° C. then pressed as films (0.5 mm thick) between Mylar at 170° C. The films were reacted with cuprous ions according to Procedure 4 at 50° C. for 4, 16, and 64 minutes. The results are plotted in FIG. 4. The results indicate that the process, as measured by the weight % copper gained by the films, follows linearly a square root of time relationship. This is a characteristic of the present invention. The resistivity of the films was conducted with air drying at room temperature or with vacuum drying at 58° C. with the copper weight gain % varied between 1.0 and 4.2%. The results of these resistivities are shown in FIG. 5. This example illustrates another characteristic of this invention, namely, the surface resistivities decrease with aging time up to a point.

Figure 6:
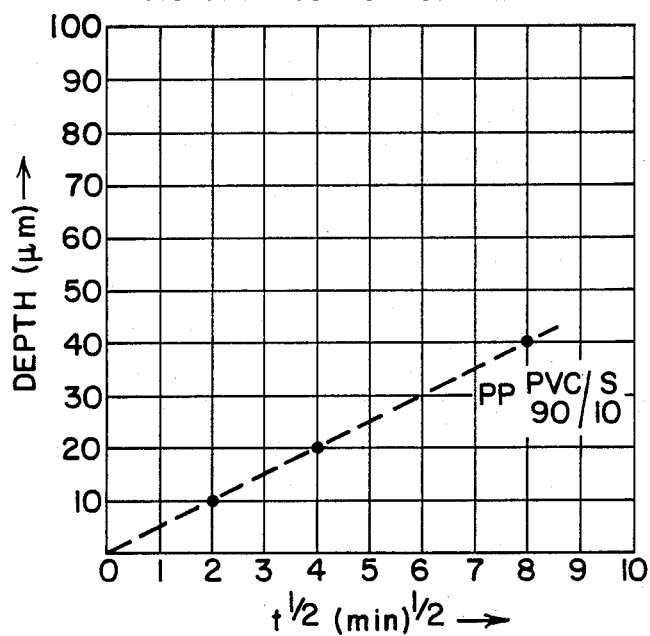
FIG. 6 is a graph of the depth of penetration of copper sulfide in microns vs. reaction time in minutes for a plasticized PVC/sulfur composite.
Figure 7:
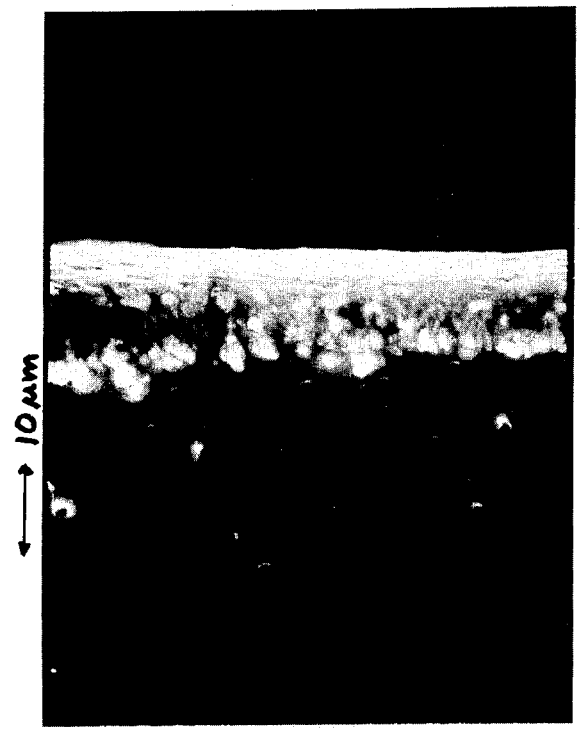
FIG. 7 is a photomicrograph of a polymeric plasticized PVC copper sulfide composite showing the dendritic copper sulfide within the plasticized PVC after a reaction time of 4 minutes.
Figure 8:
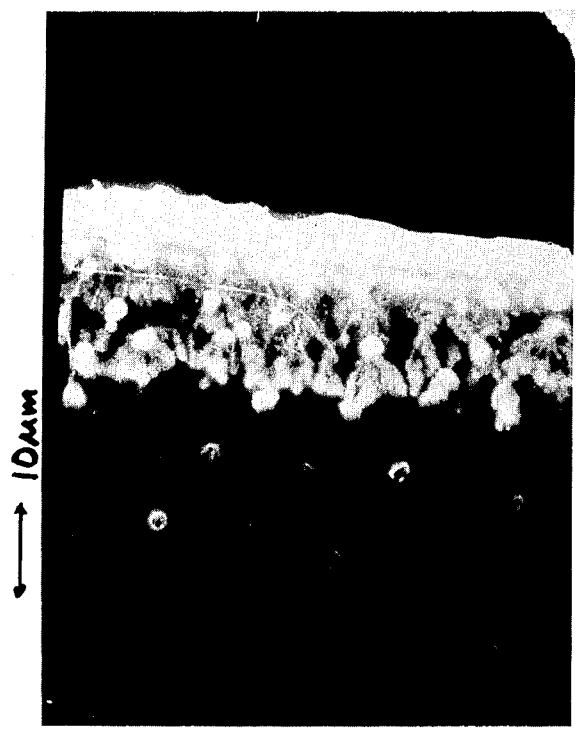
FIG. 8 is a photomicrograph of a cross-section of a plasticized PVC/copper sulfide composite after a reaction time of 16 minutes.
Figure 9:
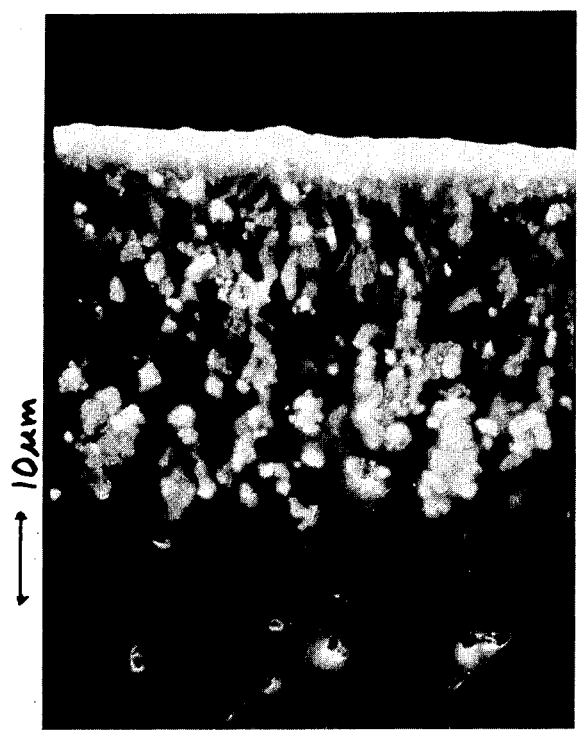
FIG. 9 is a photomicrograph illustrating a cross-section of a plasticized PVC/copper sulfide composite after a reaction time of 64 minutes.

Two other features characterize the process of this invention. The depth of copper sulfide penetration also follows a square-root time relationship as indicated in FIG. 6. In FIG. 6, the depth of copper sulfide penetration is illustrated for the plasticized PVC discussed above. Initially, photomicrographic evidence demonstrated that the reaction boundaries are relatively sharp between the copper sulfide layer and the polymer sulfur matrix. The photomicrographs show the copper sulfide layers in compositions having a reaction time of 4 minutes, 16 minutes, and 64 minutes with the cuprous ion solution. These photomicrographs are shown in FIGS. 7, 8 and 9, respectively.

A second feature or characteristic of the present process is the feather-like copper sulfide domains called dendrites. Irrespective of the polymeric matrix, the reaction to form copper sulfide has shown the characteristic dendritic structure. The dendritic structure is also shown in FIGS. 7, 8 and 9.

EXAMPLE 8

The inventor has observed that most plasticized PVC compositions have sulfur bloom with time. Obviously, for some applications this would be undesirable because of aesthetic reasons and the potential reactivity of sulfur with other chemicals. It has been discovered by the inventor that incorporation of calcium carbonate, an ingredient frequently used as an opacifing pigment in plasticized formulations, also acts to retard or prevent sulfur bloom. The following experiment illustrates the effect.

| Ingredients | Composition 1 | Composition 2 |
|---|---|---|
| Polymeric plasticizer PVC | 90 | 90 |
| Sulfur | 10 | 10 |
| CaCO$_3$ | — | 40 |
| Ferro 1840 | 2 | 2 |

The blended powders were milled at 140° C. Sheets having a thickness of 1.65 mm were prepared and reacted with cuprous ions at 60° C. for 15 minutes using Procedure 4. The results are as follows:

| | Composition 1 | Composition 2 |
|---|---|---|
| Cu gain (wt %) | 0.85 | 0.49 |
| Resistivity (ohm/sq.) dried at 50° C. for 16 hrs. | 40–65 | 50–65 |

The above films were further tested by heating at 50° C. in a vacuum oven for 54 hours. Untreated Composition 1 showed much sulfur bloom as evidenced by shiny yellow crystals on the surface of the film. Treated Composition 2 showed no sulfur crystals on the surface of the film. Generally, sulfur bloom is evidence by glossy, yellow crystals on the surface of the film or sheet in those PVC compositions that did not contain calcium carbonate. Four months after making the films, sulfur dust remains easily visible to the naked eye on the composition not employing calcium carbonate. Only with a magnifying glass could sulfur dust be seen on the surface of Composition 2 containing calcium carbonate.

EXAMPLE 9

Examples of polymers that are made conductive by the process of the present invention, other than those tested above, are Kraton G-1652, a hydrogenated styrene/butadiene/styrene block copolymer, chlorinated polyethylene, ethylene/propylene copolymer, propylene copolymer, and polyurethane. Examples of these compositions are illustrated below using Kraton G-1652 as the example:

| | Composition Wt. Parts | |
|---|---|---|
| Ingredients | 1 | 2 |
| Kraton G-1652 | 90 | 80 |
| Sulfur | 10 | 20 |
| Ethyl 702 an antioxidant | 0.25 | 0.25 |

Sheets of the above polymer/sulfur blend were molded at 150° C. Reaction with the cuprous ions was carried out according to Procedure 2 at 55° C. for 15 minutes. Reaction was instantaneous as evidence by the black color change on the sheet. One sheet (76×76×1.6 mm.) of Composition 1 had a surface resistivity of 20–40 ohms/sq. after drying in the air. The conductive sheet was electroplated with nickel at 75° C. The nickel plate adhered well to the thermoplastic elastomer, as shown by an adhesion test where the adhesive tape is stuck to a part of the surface scored with cross-hatched razor blade lines, then is pulled away leaving the squares of metal stuck to the substrate. Composition 2 gave a surface resistivity of 18–20 ohms/sq. Other polymers were compounded according to the formula of Composition 1. The polymers tested were chlorinated polyethylene (Dow Chemicals 3615) having 36 percent by weight chlorine (Composition 3), ethylene/propylene copolymer (Composition 4) (Uniroyal Vistalon 70), propylene copolymer (Composition 5) (Himont Profax SB 787), and polyurethane (Composition 6) (BFGoodrich Estane 58130). The results of these polymers are set forth on the following table:

| | Composition | | | |
|---|---|---|---|---|
| | 3 | 4 | 5 | 6 |
| Milled in °C. | 160 | 150 | 160 | 190 |
| Molded in °C. | 170 | 170 | 195 | 214 |
| Surface resistivity in ohms/sq. initially | 4–5 × 10$^3$ | 10–60 | 1.5–2 × 10$^3$ | 1–1.6 × 10$^5$ |
| 21 days later as an average surface resistivity in ohms/sq. | 650 | 70 | 1.5 × 10$^3$ | 1.6 × 10$^4$ |
| Copper gain wt. % | 1.5 | 3.3 | 1.0 | 1.8 |
| Cu$_2$S (depth in microns) | 20 | 70 | 15 | 30 |
| Conductivity in ohm$^{-1}$ cm$^{-1}$ | 0.77 | 2.0 | 0.44 | 0.02 |

The above results indicate that the depth of the copper sulfide layer is approximately proportional to the weight percent copper gain by the sample. These examples also indicate that some polymers are more "active" in their ability to bed made conductive by the present invention.

EXAMPLE 10

Similar experiments were repeated with some of the same polymers set forth in the above example and other polymers as described below. These compositions were based on the formula polymer of Composition 1 in Example 9 wherein the polymers are: (1) Kraton G-1652; (2) Polyethylene (Union Carbide 7030); (3) Plyepichlorohydrin (BFGoodrich Hydrin 100); (4) Chlorinated Polyethylene; and (5) Propylene Copolymer. The ingredients were milled together, reacted with a cuprous ion solution according to Procedure 2 at 60° C. for 15 minutes. The results are set forth in the following table:

|  | Composition | | | | |
|---|---|---|---|---|---|
|  | 1 | 2 | 3 | 4 | 5 |
| Milled Temp. °C. | 150 | 175 | 175 | 150 | 150 |
| Molded Temp. °C. | 170 | 175 | 175 | 150 | 160 |
| Copper gain wt. % | 3.0 | 0.80 | 2.2 | 4.2 | 1.6 |
| Surface resistivity in ohms/sq. initial | 11 | 575–1,000 | 5–10 × $10^4$ | 20–200 | 250–500 |
| Surface resistivity 56 days later | 4–6 | 160–280 | not determined | 22–35 | 70–150 |

Again these series of experiments demonstrate that copper sulfide can be employed to make numerous different polymers conductive and also indicate a decrease in resistivity with aging.

Although data from the above experiments indicate that little conductivity is achieved below 2.5 weight percent sulfur by reaction of aqueous cuprous ions, significant conductivity was achieved using only 1% sulfur in Kraton G-1652. The polymer/sulfur blend was pressed at 170° C. and reacted for 4 minutes with copper foil against one side of the film, employing Procedure 2. The resistivity was 60 ohms/sq.

EXAMPLE 11

Figure 10:
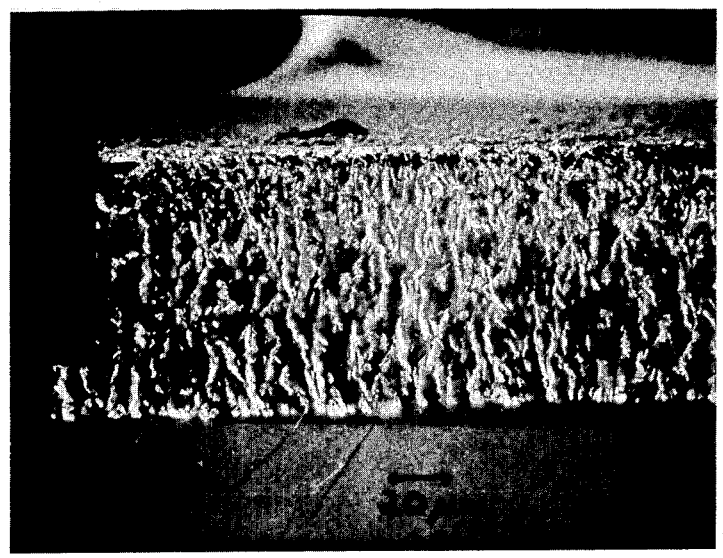
FIG. 10 is a photomicrograph illustrating a cross-section of a Kraton polymer/copper sulfide composite after a reaction time of 36 minutes.
Figure 11:
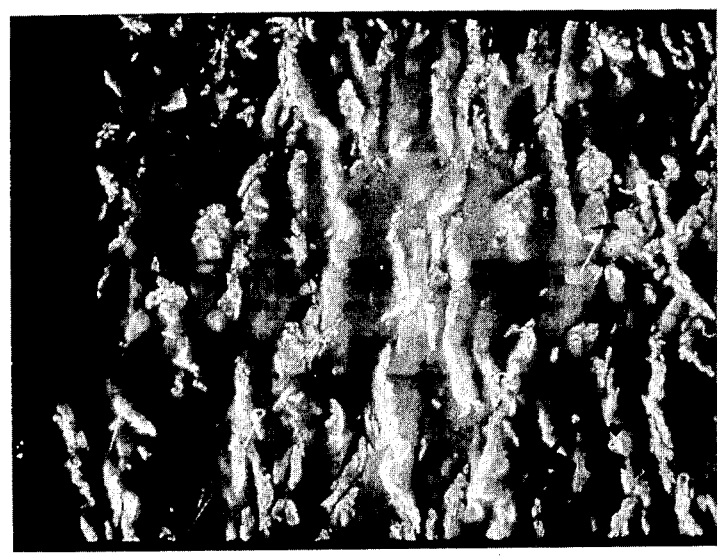
FIG. 11 is a photomicrograph of an enlarged portion of the Kraton polymer/copper sulfide composite illustrated in FIG. 10 so as to better show the dendritic crystal structure in the polymer.

FIG. 10 shows a scanning electron photomicrograph of a cross-section of 90 weight parts of Kraton and 10 weight parts of sulfur formed in a film that was reacted 36 minutes with Procedure 4 at a temperature of 60° C. The photograph is taken along a plane perpendicular to the surface of the film. From the surface of the film to a depth of about 85 microns is a packed array of dendrites, the major axis of which is perpendicular to the film surface. FIG. 11 shows a greater enlargement of FIG. 10 of the copper sulfide layer. FIG. 11 better illustrates the dendrites oriented in the Kraton block copolymer matrix. It is evident that the many "feathers" of the dendrites provide numerous contact points along the crystalline copper sulfide phase. This could explain the effectiveness of these structures (dendrites) in producing conductive composites, even at low concentrations.

Figure 12:
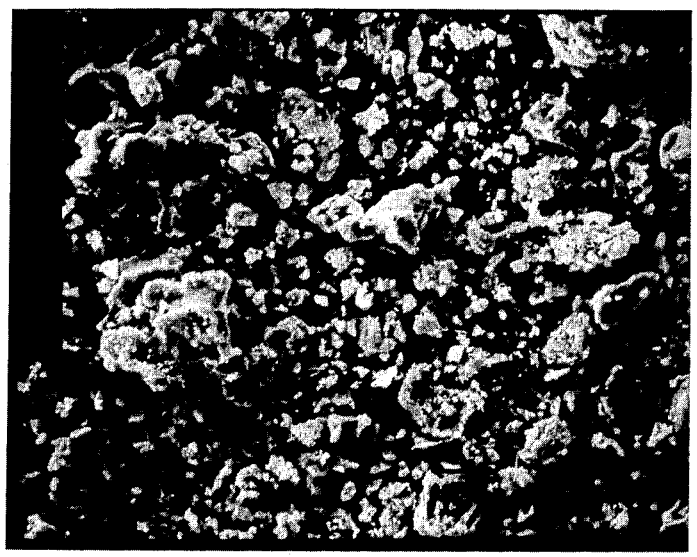
FIG. 12 is a photomicrograph illustrating a composite of copper sulfide blended with Kraton polymer employing a prior art process, and clearly illustrating the lack of any dendritic morphology for the copper sulfide.

It appears, therefore, that the formation of dendrites is a morphological feature characteristic of this invention. That the dendrites may be essential to achieving surface conductivity seems borne out by the following experiments in which powdered $Cu_2S$ or CuS was mixed in Kraton G-1652. The source of cuprous sulfide ($Cu_2S$) having a density of 5.6 was Research Organic Chemicals/Research Inorganic Chemicals and was 99.5% $Cu_2S$. A scanning electron microphotograph illustrated in FIG. 12 shows the coarse granular texture with the $Cu_2S$ particles ranging in size from 0.5 to 50 microns in diameter. Besides the sulfur, an antioxidant was added to the mixture. The ingredients were fused on a two-roll mill at 150° C. for 1 minute. In this experiment, five different levels of polymer/copper sulfide blend, with or without sulfur as an additive, were prepared as set forth below. The films were pressed at 150° C.

|  | Composition | | | | |
|---|---|---|---|---|---|
|  | 1 | 2 | 3 | 4 | 5 |
| Kraton G-1652 (in grams) | 45.3 | 40 | 40 | 40 | 40 |
| Sulfur (in grams) | — | 5.3 | — | — | — |
| $Cu_2S$ (grams) | 23.4 | 23.4 | 49.7 | 100 | 160 |
| Ethyl 702 (antioxidant) | 0.13 | 0.13 | 0.13 | 0.13 | 0.13 |
| Weight % of $Cu_2S$ | 34 | 34 | 55 | 71.4 | 79.9 |
| Volume % of $Cu_2S$ | 7.7 | 8.2 | 16.8 | 35.1 | 39.3 |
| Surface resistivity in ohms/sq. | $\leq 10^7$ | $\leq 10^7$ | $\leq 10^7$ | $\leq 10^7$ | $\leq 10^7$ |

It is clear that mixing cuprous sulfide in Kraton G-1652 is not sufficient to achieve conductivity even when the volume percent of metal sulfide is as high as 39%. The polymer Kraton G-1562 reacted most favorably with the process of the present invention, with as little as 1% sulfur.

Similar experiments with cupric sulfide (Fisher Certified) having a density of 4.6 g./ml. also resulted in no surface conductivity as demonstrated by the following examples.

|  | Composition | | |
|---|---|---|---|
|  | 6 | 7 | 8 |
| Kraton G-1652 (grams) | 40 | 40 | 40 |
| Sulfur (grams) | 5.3 | — | — |
| CuS (grams) | 14.95 | 14.95 | 126 |
| Ethyl 702 (grams) (antioxidant) | 0.13 | 0.13 | 0.13 |
| CuS weight % | 24.8 | 27.1 | 75.9 |
| Volume % | 6.5 | 6.9 | 38.4 |
| Surface resistivity in ohms/sq. | $\leq 10^7$ | $\leq 10^7$ | $\leq 10^7$ |

As previously stated, these experiments demonstrate that there is no surface conductivity. Since most cuprous ion reactions with sulfur were not carried to completion, the conductive composites have an excess of sulfur over the stoichiometric composition $Cu_2S$. For that reason, in some experiments elemental sulfur was added, but no conductivity was observed. In a related experiment, the level of cuprous sulfide was increased such that it fell in between those of Composition 5 of the first batch and Composition 1 of the second batch. In this case, a film (pressed at 150° C.) showed surprising conductivity.

| Ingredients | Level of Ingredients |
|---|---|
| Kraton G-1652 | 19.3 grams |
| Sulfur | 4.8 grams |
| $Cu_2S$ | 77.0 grams |
| Ethyl 702 | 0.06 grams |
| $Cu_2S$ (wt %) | 76.2 |
| Volume % | 36.7 |
| Resistivity (ohms/sq.) | 80–110 |

The surface resistivity was 200–300 ohms/sq. initially. After standing for approximately 1 day, it has decreased to 80–110 ohms/sq. It was noted that the reading of the resistivity was quite variable, being very sensitive to the pressure applied to the electrodes. Although surface conductivity was produced, there was no bulk conductivity, that is, no conductivity from one side to the other side. Furthermore, this approach to making a polymer conductive with powdered cuprous sulfide does not appear practical because of the high level of copper sulfide needed.

It will be recalled that copper sulfide dispersed alone in the polymer did not produce conductivity (see Composition 1 of Example 11) and that elemental sulfur itself is a very good insulator, resistivity about $10^{17}$. Hence, there must be some kind of special interaction between the sulfur and the copper sulfide dispersed in the medium because sulfur alone is not conductive. The explanation cannot lie in the occurrence of copper sulfide dendrites because a photomicrograph of the viewed material showed only granules of copper sulfide.

EXAMPLE 12

Sulfur is known to form alloys with many elements. Some, such as selenium or tellurium, can be substituted for sulfur in its 8-membered ring or polymeric states. similar sulfur alloys can be dispersed in polymers and treated with cuprous ion or copper metal to make conductive composites. Thus, a mixture of sulfur (9.7 grams) and selenium (10.3 grams) were blended with a mortar and pestle to give a 70 gram-atom percent sulfur powder. Obviously, other compositions are possible. This one was chosen because it is close to a eutectic mixture and hence has a low solidus/liquidus temperature.

A 20 weight percent of this masterbatch with Kraton g-1652 and an antioxidant were fused on a 2-roll mill at 150° C. The stock at this point had an olive color and showed incomplete dissolution of the selenium. This was understandable afterwards when it was observed that a sample of the sulfur/selenium mixture showed a broad melting peak in the 147°–207° C. range due to the selenium. Films pressed at higher temperatures showed an orange color and more dissolution of the selenium particles. The following results were obtained on films having a thickness of 0.5 mm treated with cuprous ions at 65° C. for four minutes using Procedure 7.

|  | Composition 1 | Composition 2 |
|---|---|---|
| Pressed Temp. (°C.) | 180 | 210 |
| Copper gain (wt %) | 3.74 | 2.95 |
| Resistivity ohms/sq. after 1 hr drying at 50° C. | 6–10 | 30–40 |

In another series of experiments, lesser amounts of the alloy were dispersed in the Kraton G-1652. In these experiments, the stocks were fused on a mill at 210° C. Under these conditions, Composition 1 above showed no sulfur or selenium melting peaks by DSC analysis. When hot, the stocks were red. After cooling, they changed to an orange color. They looked uniform in consistency. Unlike similar compositions with only sulfur, which were clear at or above 150° C., the sulfur/selenium compositions resulted in an opaque color even at 210° C.

Two films having a thickness of 0.5 mm of the following composition were pressed at 180° C. and reacted with cuprous ions according to Procedure 7 for four minutes at 60° C.

|  | Composition 3 | Composition 4 |
|---|---|---|
| Kraton G-1652 | 47.5 gm. | 48.75 gms. |
| Selenium/sulfur | 2.5 gm. | 1.25 gms. |
| Ethyl 702 | 0.13 gm. | 0.13 gms. |
| Alloy (wt %) | 5 | 2.5 |
| Copper gain (wt %) (2 samples each) | 1.3–1.4 | 1.0–1.2 |
| Resistivity (ohms/sq.) | 200–500 | $5–10 \times 10^3$ |
| after 1 hr drying at 50° C. | 190–500 | $5 \times 10^3 – 5 \times 10^4$ |

The surface conductivity was achieved with as little as 2½ wt % of sulfur/selenium alloy. It was observed that reaction of copper with the sulfur/selenium alloy created dendritic crystals.

Selenium is too toxic and foul swelling to act as a total replacement for sulfur. Also, tellurium melts (452° C.) too high to use as a total replacement for sulfur. The polymer would decompose at such temperatures.

Nickel will not form nickel sulfide in dendritic form. Silver ion will, but owing to its cost and the higher resistivity of $Ag_2S$, it is impractical compared with copper.

Thus, it is apparent that there has been provided, in accordance with the invention, a method and a product produced by the method that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the present invention.

What is claimed is:

1. A conductive polymer useful for static charge dissipation, electromagnetic induction shielding, and electroplating consisting essentially of:
   (a) a blend of a polymer, and
   (b) a sufficient amount of dendritic copper sulfide within said polymer so that said polymer has a resistivity of below about 10,000 ohms/sq.

2. A method for making a conductive polymer for static charge dissipation, electromagnetic induction shielding, and electroplating comprising:
   (a) uniformly mixing into a molten or semi-molten polymer 1 to 30% by weight of elemental sulfur to form a polymer/sulfur blend;
   (b) cooling said polymer/sulfur blend until it solidifies; and
   (c) exposing said solidified polymer/sulfur blend to an aqueous cuprous ion solution at a temperature of from about 0° C. to about 100° C. thereby causing said cuprous ions to react with the sulfur to form copper sulfide dendrites within said polymer so that said polymer has a resistivity of below about 10,000 ohm/sq.

3. The method of claim 2, wherein said aqueous cuprous ions add copper to said polymer/sulfur blend in a range of from 0.5 to 50% by weight of added sulfur to form the copper sulfide.

4. The method of claim 2, wherein said polymer is chlorinated polyvinyl chloride, polyvinyl chloride, hydrogenated-styrene-butadienestyrene block copolymer, chlorinated polyethylene, ethylenepropylene copolymer, polypropylene, polyurethane, polyepichlorohydrin, and combinations thereof.

5. The method of claim 2, wherein said aqueous cuprous ion solution also includes elemental copper.

6. The method of claim 5, wherein said aqueous cuprous ion solution contains an effective amount of dilute hydrochloric acid or dilute ammonium hydroxide to aid in the facilitation of complexation.

7. The method of claim 2, wherein said conductive polymer has a resistivity of less than 400 ohms/sq.

8. A conductive polymer formed by the process of claim 2.

9. A conductive polymer formed by the process of claim 6.

10. A conductive polymer according to claim 1, wherein said dendritic copper sulfide is made by reacting cuprous ions with elemental sulfur, said elemental sulfur having been mixed with said polymer, and wherein the amount of said elemental sulfur is from about 1 percent to about 30 percent by weight based upon the total weight of said elemental sulfur and said polymer.

11. A conductive polymer according to claim 10, wherein said meltable polymer is chlorinated polyvinyl chloride, polyvinyl chloride, hydrogenated-styrene-butadiene-styrene block copolymer, chlorinated polyethylene, ethylene-propylene copolymer, polypropylene, polyurethane, polyepichlorohydrin, and combinations thereof.

12. A conductive polymer according to claim 11, wherein the amount of said elemental sulfur is from about 2.5 percent to about 20 percent by weight based upon the total weight of said elemental sulfur and said polymer.

13. A conductive polymer according to claim 12, wherein said polymer has a resistivity of below about 400 ohm/sq.

* * * * *

UNITED STATES PATENT AND TRADEMARK OFFICE
CERTIFICATE OF CORRECTION

PATENT NO. : 4,863,635
DATED : September 5, 1989
INVENTOR(S) : Marvin H. Lehr

It is certified that error appears in the above-identified patent and that said Letters Patent is hereby corrected as shown below:

Column 3, line 11, "stoichimetric" should read ---stoichiometric---.

Column 10, line 20, "this" should read ---thin---.

Column 11, line 51, "evidence" should be ---evidenced---.

Column 12, line 12, "evidence" should be ---evidenced---.

Column 12, line 53, "bed" should read ---be---.

Column 15, line 18, "similar" should be capitalized.

Column 15, line 28, "g-1652" should read ---G-1652---.

Signed and Sealed this

Fourteenth Day of July, 1992

Attest:

DOUGLAS B. COMER

Attesting Officer     Acting Commissioner of Patents and Trademarks